United States Patent Office 2,962,995
Patented Dec. 6, 1960

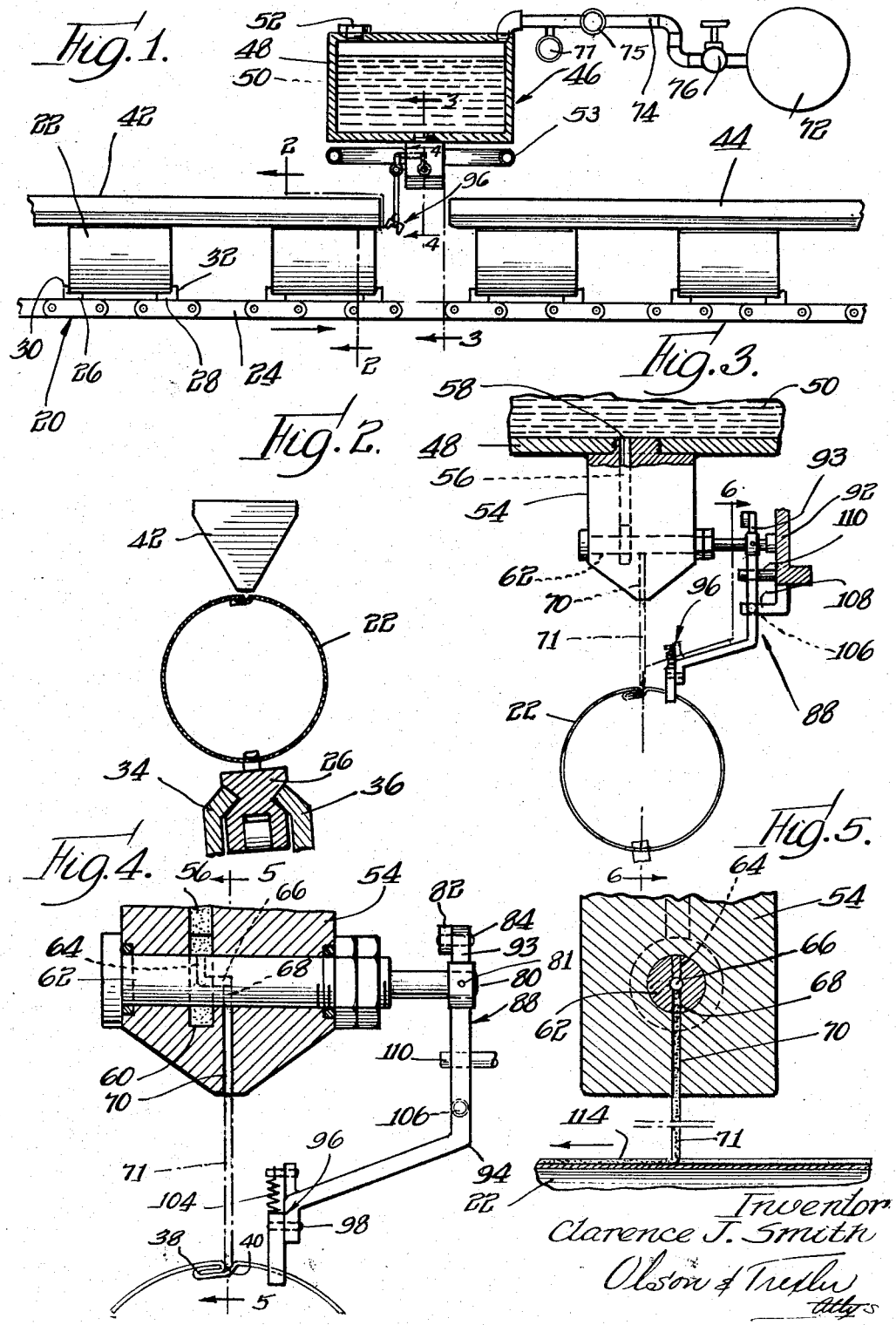
Dec. 6, 1960 — C. J. SMITH — 2,962,995
APPARATUS FOR SOLDERING CAN BODY SIDE SEAMS
Filed Feb. 19, 1957 — 2 Sheets-Sheet 1
Inventor
Clarence J. Smith

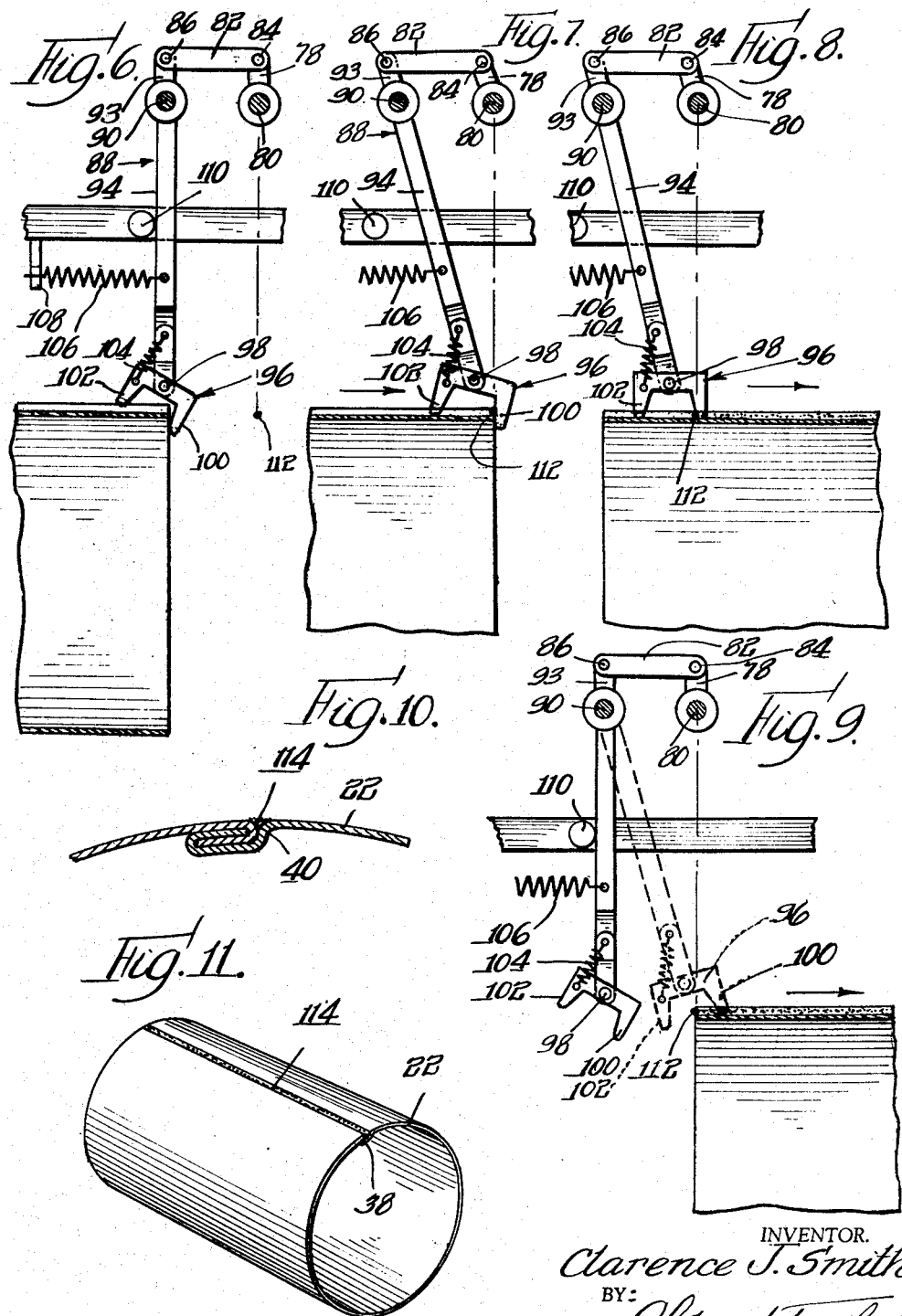

2,962,995
APPARATUS FOR SOLDERING CAN BODY SIDE SEAMS

Clarence J. Smith, Rockford, Ill., assignor to W. F. and John Barnes Company, Rockford, Ill., a corporation of Illinois Filed Feb. 19, 1957, Ser. No. 641,058

5 Claims. (Cl. 113—60)

The present invention relates to a novel apparatus for soldering side seams of can bodies and the like.

In side seam soldering apparatus now in general use, can bodies are successively advanced by a conveyor past an elongated roller which is partially emersed in an open bath of molten solder and is disposed for wiping against the side seam portions of the can bodies and applying solder thereto. With such apparatus, the solder is applied to the can bodies along a relatively wide band so that an excessive amount of solder is used. Furthermore, when the can body is to be lithographed, the relatively wide band of solder detracts from the appearance of the finished can and unnecessarily limits the area of the cam body which may be lithographed. Another problem encountered with heretofore suggested soldering apparatus is that the composition of the solder bath changes so that it must be intermittently checked and corrected. For example, the roller tends to pick up tin from the can bodies so that the tin content of the solder bath is unduly increased, and the open solder bath is subject to oxidation.

An important object of the present invention is to provide a novel side seam soldering apparatus which is capable of substantially reducing the amount of solder required for each side seam and which is capable of applying the reduced amount of solder in a manner so that side seams of similar or even greater strength are obtained as compared with side seams which are soldered by apparatus heretofore in general use.

Another object of the present invention is to provide a novel side seam soldering apparatus which is adapted to apply the solder to narrow areas of the can bodies so that greater areas of the can bodies are available for lithographing and a finished can having an improved appearance may be obtained.

Still another important object of the present invention is to provide a novel side seam soldering apparatus which is constructed so that the composition of a supply of molten solder remains substantially constant so that the need for checking the composition is eliminated and additional ingredients need be added to the supply only when the supply is or is about to become exhausted.

Other objects and advantages of the present invention will become apparent from the following description and the accompanying drawings wherein:

Fig. 1 is a fragmentary simplified side elevational view showing an apparatus incorporating features of the present invention;

Fig. 2 is a fragmentary enlarged sectional view taken along line 2—2 in Fig. 1;

Fig. 3 is a fragmentary enlarged sectional view taken along line 3—3 in Fig. 1;

Fig. 4 is a further enlarged fragmentary sectional view taken along line 4—4 in Fig. 1;

Fig. 5 is a fragmentary sectional view taken along line 5—5 in Fig. 4;

Fig. 6 is an enlarged fragmentary sectional view taken generally along line 6—6 in Fig. 3;

Figs. 7, 8 and 9 are similar to Fig. 6 but respectively show successive steps in the operation of the apparatus;

Fig. 10 is an enlarged fragmentary sectional view showing a side seam which is soldered in accordance with the present invention; and Fig. 11 is a perspective view showing a can body having its side seam soldered in accordance with the present invention.

Referring now more specifically to the drawings wherein like parts are designated by the same numerals throughout the various figures, the apparatus of the present invention includes an endless conveyor 20 adapted to advance can bodies 22 continuously along a predetermined path of travel. The conveyor 20 may be similar to or a continuation of the endless conveyor disclosed in a co-pending application Serial No. 641,195 filed February 19, 1957, now Patent No. 2,925,059 issued February 16, 1960. Reference is hereby made to this co-pending application for details of the conveyor structure and it suffices to state herein that the conveyor includes an endless chain 24 having blocks 26 and 28 spaced thereon and carrying can body gripping and retaining means 30 and 32. The blocks 26 and 28 have V-shaped grooves on their opposite sides and are confined by longitudinal extending guide rods 34 and 36 which project into these grooves. Preferably, these guide rods 34 and 36 are twisted slightly adjacent a soldering applying station to be described below so that the blocks 26 and 28 will be tilted for tilting the can bodies carried thereby at the solder applying station. The desired tilted condition of the can bodies is shown best in Fig. 4, and more specifically, the can bodies are successively tilted so that the inner locked side seam portions thereof generally designated by the numeral 38 are slightly offset from a vertical plane containing the longitudinal axis of the bodies and an outwardly opening groove 40 at the side seam is disposed substantially in the vertical plane.

Disposed above the conveyor are elongated electrical induction heating coils 42 and 44, between which coils is disposed a solder applying mechanism generally designated by the numeral 46. The coils are arranged so that margins thereof will be disposed adjacent to but slightly spaced from side seams of can bodies passing therebeneath so as to accomplish heating of the side seams and adjacent portions of the can bodies. In the embodiment illustrated, the conveyor moves toward the right as viewed in Fig. 1 so that the coil 42 may conveniently be designated as a preheating coil and the coil 44 may be designated as a postheating coil. The coils extend longitudinally of the conveyor sufficiently so that the can bodies are exposed to the heating effect thereof for a predetermined time interval required to heat the can bodies to the desired temperature. By way of example only, the coils 42 and 44, respectively, may be made about six feet long when the conveyor is to be operated for advancing about six hundred can bodies per minute past the solder applying mechanism.

The solder applying mechanism 46 comprises a closed pressure container or reservoir 48 adapted to contain a body 50 of molten solder. The capacity of the reservoir may, of course, be varied as desired, but by way of example only, a reservoir capable of containing a fourteen-inch cube of molten solder is sufficient to permit six hundred cans per minute to be processed for eight hours. A pressure cap 52 is provided in the top of the reservoir to permit the reservoir to be re-filled when necessary. A gas burner 53 or any other suitable heating means is disposed beneath the reservoir 48 for heating the reservoir and maintaining the solder therein in a molten condition. A nozzle and control valve body 54 is secured to the bottom of the reservoir 48 and is provided with a vertical passageway 56 which communicates with an aperture 58 in the bottom of the reservoir. The passageway 56 communicates at its lower end with an annular chamber 60, and a rotary valve stem 62 extends transversely through the body 54 and the chamber 60. A first transverse passageway 64 in the valve stem 62 communicates with the chamber 60 and also with a central longitudinally extending passageway 66 in the valve stem. A second transverse passageway 68 is formed in the valve stem and axially spaced from the passageway 64 and communicates with the axial passageway 66. When the valve stem 62 is in the position shown best in Figs. 4 and 5, the passageway 68 communicates with a discharge passageway 70 in the outer or lower end of the body 54 so that molten solder in the form of a jet or stream 71, shown in broken lines in Figs. 3 and 4 and in solid lines in Fig. 5, may be ejected from the passageway 70. When the valve stem is angularly displaced from the position shown in Figs. 4 and 5 so that the passageway 68 is disconnected from the passageway 70 and blocked by the wall of the bore in which the valve stem 62 is snugly rotatably disposed, the spray of solder will be stopped. The reservoir 48 is maintained under super-atmospheric pressure for forcing or ejecting the solder from the nozzle when the valve is opened, and, in addition, an inert atmosphere is maintained in the reservoir so as to prevent oxidation of the molten solder. Thus, as shown in Fig. 1, a supply tank 72 containing a suitable inert gas such as nitrogen under pressure is connected with the upper end of the reservoir by conduit means 74. A shutoff valve 76 is provided in the conduit so that the gas pressure tank may be disconnected from the reservoir whenever it is desired to open the reservoir for re-filling or other purposes. Also, an adjustable pressure regulator 75 and a pressure gauge 77 are connected in the conduit 74 for controlling the pressure in the reservoir 48. For example, a pressure of from about 5 p.s.i. to 7.5 p.s.i. in the reservoir has been found to be desirable for forcing a jet of molten solder from the nozzle.

The solder applying mechanism is provided with means for turning the valve stem 62 to start the jet of solder when the leading end of a can body side seam comes into alignment with the discharge passageway 70 and for subsequently turning the valve stem 62 to stop the jet or stream of solder when the trailing end of the side seam passes from beneath the passageway 70. Thus, ejection of solder between successive can bodies is substantially eliminated, and this means also serves to prevent the ejection of solder in the event of a gap in the series of can bodies. The means for controlling the valve stem 62 is shown in Figs. 1, 3, 4 and 6–9 and comprises a lever 78 fixed on an outer end portion 80 of the valve stem 62. A pin 81 or any other suitable means is provided for preventing relative rotation between the valve stem and lever 78. A link 82 has one end pivotally connected as at 84 to the lever 78 and an opposite end pivotally connected as at 86 to one end of another lever 88. The lever 88 is pivotally mounted between its ends on a pin 90 extending from a suitable support member or bracket 92. A portion 93 of the lever 88 to which the link 82 is connected extends above the pivot pin 90 and a second elongated portion 94 of the lever projects to a position adjacent the path of the can bodies carried by the conveyor. A generally U-shaped member 96 is pivotally connected as at 98 to the lower end of the lever portion 94 and includes fingers 100 and 102 which project for engagement with can bodies carried by the conveyor. A spring 104 is connected between the finger 102 and the lever portion 94 for resiliently urging the member 96 in a clockwise direction as viewed in Figs. 6–9 to the position relative to the lever portion 94 shown in Fig. 6. In this position, the finger 100 projects into the path of travel of the can bodies while the finger 102 is disposed slightly outside of the can body path of travel. A spring 106 which is stronger than the spring 104 is connected between the lever portion 94 and a pin 108 extending from the support bracket 92 for normally urging the lever portion 94 against a stop member 110 also projecting from the bracket 92 as shown in Fig. 6.

The control means elements are normally maintained in the positions shown in Fig. 6 by the springs prior to the start of a solder ejecting operation, and with the elements in these positions, the valve stem 62 is located so that the passageway 68 is disconnected from the discharge passageway 70. Upon advancement of a can body, the control means is actuated to start and stop a solder ejecting operation in the following manner. When a can body advances from the position shown in Fig. 6 toward the right, the leading edge thereof engages the finger 100 and tends to turn the member 96 in a counterclockwise direction against the action of the spring 104. Such turning of the member 96 is initially prevented by engagement of the finger 102 with the outer surface of the cam body so that the lever 88 is pivoted against the action of the spring 106 toward the position shown in Fig. 7. This movement of the lever 88 is transmitted through the link 82 and the lever 78 so that the valve stem 62 is turned to connect the passageway 68 to the discharge passageway 70 when the leading edge of the can body side seam reaches a point in space designated by the numeral 112 in alignment with the discharge passageway 70. As the can body continues to advance, the member 96 is turned until the finger 100 rides up onto the outer surface of the can body as shown in Fig. 8. As the trailing end of the can body blank approaches the point 112 as shown in Fig. 9, the finger 102 extends behind the trailing edge of the can body. The stronger spring 106 then begins to swing the lever portion 94 back toward the stop 110 and this causes the member 96 to be pivoted in a counterclockwise direction against the action of the spring 104 as shown in broken lines in Fig. 9. The finger 100, when the member 96 is in the broken line position, no longer prevents reverse movement of the lever portion 94 so that the spring 106 returns the elements to the solid line position shown in Fig. 9 and, thus, closes the rotary valve and stops the ejecting operation when the trailing edge of the can body reaches the point 112. It will be appreciated that when the finger 100 becomes fully disengaged from the can body, the spring 104 will reposition the member 96 for proper engagement with a succeeding can body. As shown best in Fig. 4, the discharge passageway 70 of the nozzle is disposed for directing molten solder into the outwardly opening groove 40 of a can body side seam. The solder flows by capillary action and under the influence of gravity into the side seam and between the folded and interlocked portions thereof and is substantially uniformly distributed throughout the side seam whereby effectively to secure and seal the side seam. It is to be noted that the solder is applied to the can body in a relatively narrow band 114 as shown in Figs. 4, 10 and 11, which band is confined substantially within the area of the groove 40. This is to be contrasted with procedures heretofore in general use wherein solder is applied by a wiping roller over relatively wide areas of the can body at opposite sides of the groove 40 with the resulting use of excessive amounts of solder. More specifically, it has been found that with the apparatus of the present invention, the amount of solder applied to each can body side seam need be only about one-third of the amount of solder applied to a can body side seam by the apparatus now in general use. It will further be appreciated that the relatively narrow band 114 of solder leaves substantially a maximum of the can body area available for lithographing. While in Fig. 4 the can body is shown tilted so as to displace the side seam slightly from a vertical plane and the nozzle is disposed for directing the solder vertically downwardly into the groove, it is contemplated that the can body may be positioned so that its side seam is bisected by the vertical plane and the nozzle could be located or modified so as to direct the stream of molten solder laterally and downwardly into the groove 40.

The method of soldering can body side seams with the apparatus of the present invention is as follows. The can bodies are conveyed continuously along a predetermined path of travel, which can bodies may be spaced in the manner shown. In the above mentioned co-pending application, the formation of a continuous strip of integrally joined can bodies is disclosed, and such an integral strip of can bodies may also be continuously conveyed through the soldering apparatus of this invention after which the can bodies will be separated from each other. As the can bodies whether separated from each other or integrally joined pass beneath the coil 42, their side seam portions are heated preferably at least to the melting temperature of solder. Then as the side seam portions pass beneath the nozzle and valve member 54, a narrow band of solder is applied thereto in the manner described above. It is to be noted that the conveyor is disposed well below the nozzles so that there is a substantial air gap between the end of the passageway 70 and the can body side seams. The solder in the jet passing through this air gap is air cooled so that it is partially solidified sufficiently to promote adherence of the solder to a side seam immediately upon contact therewith. For example, an air gap of about three inches has been found to provide satisfactory cooling of the solder. Then the solder is heated by the side seams and coil 44 and begins to flow into the side seams. It is to be noted that the speed of the can bodies, the pressure within the solder container and the size of the nozzle passageways are correlated so that a substantially predetermined measured amount of solder is applied to each can body. The can bodies travel beneath the coil 44 which serves to heat the side seam portions thereof and the solder to a temperature which is sufficient to promote the flow of the solder throughout the side seam portions. Finally, the can bodies emerge from beneath the coil 44 and their side seam portions and the solder are quickly air-cooled so that the solder solidifies and the side seams are completed.

While the preferred embodiment of the present invention has been shown and described herein, it is obvious that many structural details may be changed without departing from the spirit and scope of the appended claims. It is to be understood that the term "can bodies" or the like in the claims is intended to mean either separated can bodies or can bodies integrally joined in a continuous tube as disclosed in the above mentioned co-pending application.

The invention is claimed as follows:

1. An apparatus for soldering side seams of can bodies and the like comprising means for advancing a series of can bodies with side seam portions thereof moving along a predetermined path of travel and facing upwardly, electrical induction coil means disposed along and over said path of travel for heating the can body side seam portions, a closed reservoir adjacent said path of travel for containing a body of molten solder, means maintaining an inert atmosphere under superatmospheric pressure in said reservoir, a nozzle connected with said reservoir and disposed above said path of travel for directing a quantity of molten solder downwardly into outwardly opening grooves of successive can body side seam portions, the heating of the side seam portions serving to promote flow of the molten solder throughout the side seam portions, rotary valve means disposed between said reservoir and said nozzle for controlling flow of solder through the nozzle, pivoted lever means connected with said valve means for operating the valve means and having a portion adjacent said path of travel, and a member pivoted to said lever means portion and having a pair of spaced can engageable fingers offset along said path of travel for actuating said lever means to open the valve means only when a can body is in alignment with said nozzle.

2. An apparatus, as defined in claim 1, wherein said heating coil means is disposed along said path of travel in advance of said solder ejecting means.

3. An apparatus, as defined in claim 1, wherein said heating coil means is disposed along said path of travel downstream from said ejecting means.

4. An apparatus, as defined in claim 1, wherein said heating coil means includes a first portion disposed upstream of said path of travel from said spraying means and a second portion disposed downstream of said path of travel from said ejecting means.

5. A method of soldering side seams of can bodies and the like comprising advancing a series of can bodies with side seam portions thereof facing upwardly and moving along a predetermined path of travel at a substantially constant predetermined speed, maintaining a body of molten solder adjacent said path of travel, constantly enclosing said body of molten solder in an uninterrupted inert atmosphere, maintaining said inert atmosphere at a predetermined pressure, ejecting under influence of said pressure a stream of molten solder from said body through an orifice of predetermined size and applying the molten stream onto the side seam portions of the can bodies from a point spaced from the side seam portions sufficiently to promote air cooling of the molten solder stream which causes the solder to solidify sufficiently at contact with the side seam portions immediately to adhere to the side seam portions upon engagement therewith, the speed of advancement of the can bodies being correlated with said pressure and the size of the orifice for applying a measured quantity of solder to successive can body side seam portions, and heating the side seam portions for promoting flow of the solder throughout the side seam portions.

References Cited in the file of this patent

UNITED STATES PATENTS

| | | |
|---|---|---|
| 480,034 | Quentell | Aug. 2, 1892 |
| 784,202 | Berg et al. | Mar. 7, 1905 |
| 842,926 | Walsh | Feb. 5, 1907 |
| 1,227,617 | Hodgson | May 29, 1917 |
| 1,918,661 | Phelps | July 18, 1933 |
| 2,054,086 | Jones | Sept. 15, 1936 |
| 2,430,219 | Elser | Nov. 4, 1947 |
| 2,469,392 | Jones et al. | May 10, 1949 |
| 2,597,893 | Nordquist | May 27, 1952 |